United States Patent
Chin (10) Patent No.: US 7,710,510 B2
(45) Date of Patent: May 4, 2010

(54) LIQUID CRYSTAL DISPLAY AND ADJUSTABLE SUPPORT THEREOF

(75) Inventor: Chung Hsien Chin, Taipei (TW)

(73) Assignee: BenQ Corporation, Taipei (TW)

( * ) Notice: Subject to any disclaimer, the term of this patent is extended or adjusted under 35 U.S.C. 154(b) by 580 days.

(21) Appl. No.: 11/737,716

(22) Filed: Apr. 19, 2007

(65) Prior Publication Data

US 2007/0182878 A1      Aug. 9, 2007

Related U.S. Application Data (62) Division of application No. 10/912,509, filed on Aug. 5, 2004, now Pat. No. 7,227,598.

(30) Foreign Application Priority Data

Aug. 21, 2003   (TW) ............................... 92122980 A (51) Int. Cl.
*G02F 1/1333* (2006.01)
(52) U.S. Cl. .......................................... 349/60; 349/58
(58) Field of Classification Search ............. 349/58–61; 248/146, 917
See application file for complete search history.

(56) References Cited

U.S. PATENT DOCUMENTS 6,381,125 B1    4/2002   Mizoguchi
6,905,099 B2 *  6/2005   Sung ........................... 248/146

FOREIGN PATENT DOCUMENTS

JP          11184395 A       7/1999

* cited by examiner

*Primary Examiner*—Dung T. Nguyen (57) ABSTRACT

A liquid crystal display and adjustable support thereof. The liquid crystal display includes a display panel, a moving assembly and a locking assembly. The moving assembly is connected to the display panel, and moves the display panel. The locking assembly is moveable between a first position and a second position. When the locking assembly is in the first position, the moving assembly is abutted by the locking assembly so that the display panel cannot be moved by the moving assembly. When the locking assembly is in the second position, the moving assembly is not abutted by the locking assembly so that the display panel can be moved by the moving assembly.

8 Claims, 8 Drawing Sheets

LIQUID CRYSTAL DISPLAY AND ADJUSTABLE SUPPORT THEREOF

This application is a divisional of U.S. application Ser. No. 10/912,509, filed Aug. 5, 2004, the entire disclosure of which is hereby incorporated by reference.

BACKGROUND

The invention relates to a liquid crystal display and a support thereof; in particular, the invention relates to a liquid crystal display with an adjustable support providing the capability to remain in a collapsed state during transport.

A liquid crystal display normally includes a support with height adjustment function, based on user requirement.

The support of the conventional liquid crystal display is not, however, provided with the capability to remain in a collapsed state during transport. The moveable distance of the support is normally about 130 mm. When the user transports the liquid crystal display, the volume of the entire liquid crystal display increases since the support cannot be remained in a collapsed state at the minimum height. Thus, it is inconvenient for the user.

SUMMARY

In view of this, the invention provides a liquid crystal display with an adjustable support providing the capability to remain in a collapsed state during transport.

Another purpose of the invention is to provide an adjustable support that can remain in a collapsed state during transport.

Accordingly, the invention provides a liquid crystal display including a display panel, a moving assembly and a locking assembly. The moving assembly is connected to and moves the display panel. The locking assembly is moveable between a first position and a second position. When the locking assembly is in the first position, the moving assembly is abutted by the locking assembly, such that the display panel cannot be moved by the moving assembly. When the locking assembly is in the second position, the moving assembly is not abutted by the locking assembly, such that the display panel can be moved by the moving assembly.

In a preferred embodiment, the moving assembly moves between a third position and a fourth position. When the moving assembly is in the third position and the locking assembly is in the first position, the moving assembly is abutted by the locking assembly. When the moving assembly is in the fourth position and the locking assembly is in the first position, the moving assembly engages with the locking assembly. The moving assembly includes an adjusting member and a first elastic member. The adjusting member is connected to the display panel. The first elastic member is connected to the adjusting member, and maintains the adjusting member in the third position. When the moving assembly is in the third position and the locking assembly is in the first position, the first elastic member is abutted by the locking assembly. When the moving assembly is in the fourth position and the locking assembly is in the first position, the first elastic member is compressed. The locking assembly includes an engaging member and a second elastic member. The engaging member is moveable between the first position and the second position. When the engaging member is in the first position, the engaging member is abutted by the first elastic member. The second elastic member is connected to the engaging member, and returns the engaging member to the first position. The engaging member includes a first hook, and the adjusting member includes a second hook. When the adjusting member is in the fourth position and the engaging member is in the first position, the first hook engages the second hook. The first hook includes a first tapered surface facing the moving assembly, and the second hook includes a second tapered surface facing the locking assembly.

In another preferred embodiment, the moving assembly is moveable between a third position and a fourth position. When the moving assembly is in the fourth position and the locking assembly is in the first position, the moving assembly engages the locking assembly. When the moving assembly is in the third position and the locking assembly is in the first position, the moving assembly is separated from the locking assembly. The locking assembly includes an engaging member and a third elastic member. The engaging member is moveable between the first position and the second position. When the moving assembly is in the fourth position and the engaging member is in the first position, the engaging member engages the moving assembly. The third elastic member is connected to the engaging member, and returns the engaging member to the first position. The engaging member includes a first hook, and the moving assembly includes a second hook. When the moving assembly is in the fourth position and the engaging member is in the first position, the first hook engages the second hook. The first hook includes a first tapered surface facing the moving assembly, and the second hook includes a second tapered surface facing the locking assembly.

In the invention, an adjustable support for raising and lowering a device is provided. The support includes a moving assembly and a locking assembly. The moving assembly is connected to the device, and rises and lowers the device. The locking assembly is moveable between a first position and a second position. When the locking assembly is in the first position, the moving assembly is abutted by the locking assembly so that the device is not moved by the moving assembly. When the locking assembly is in the second position, the moving assembly is not abutted by the locking assembly so that the device is moved by the moving assembly.

BRIEF DESCRIPTION OF THE DRAWINGS

The present invention can be more fully understood by reading the subsequent detailed description and examples with references made to the accompanying drawings, wherein.

DETAILED DESCRIPTION

First Embodiment

Figure 1:
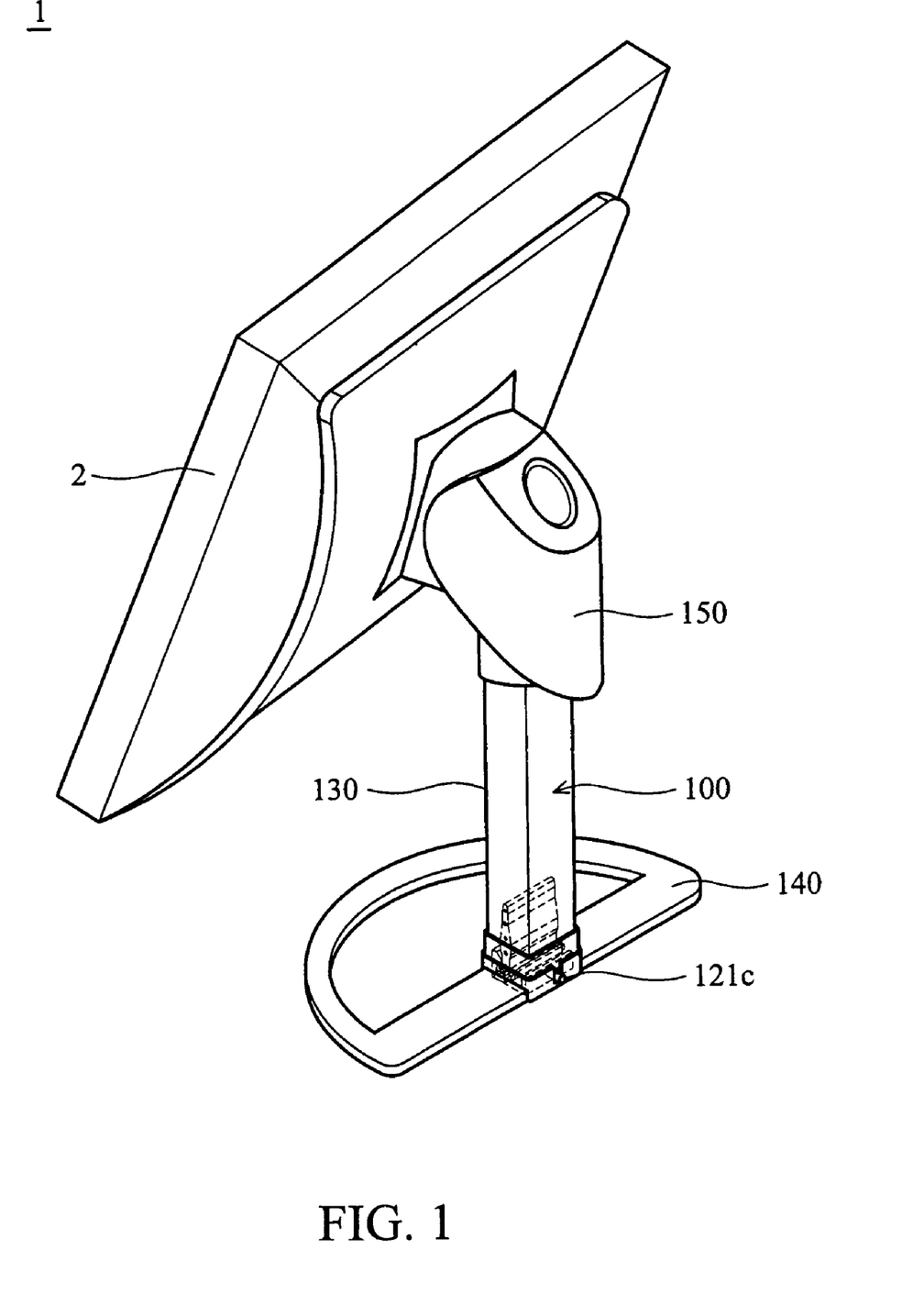
FIG. 1 is a schematic view of a liquid crystal display as disclosed in the invention.

Referring to FIG. 1, a liquid crystal display, disclosed in a first embodiment of the invention, includes a display panel 2 and an adjustable support 100. The display panel 2 is used as a display unit of the liquid crystal display 1. Since the structure of the display panel 2 follows the conventional structure, its description is omitted.

Figure 2A:
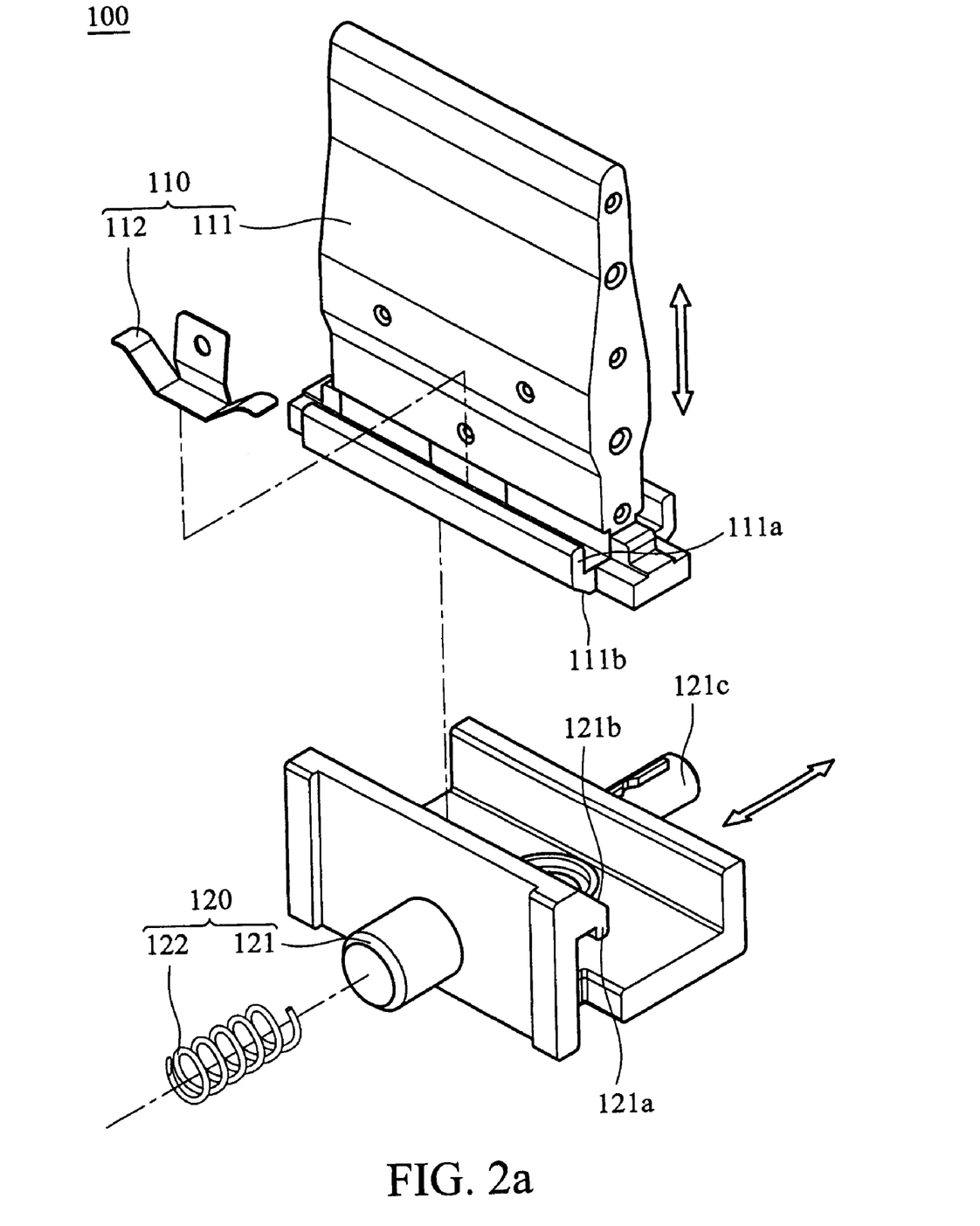
FIG. 2a is an exploded view of an adjustable support in FIG. 1.
Figure 2B:
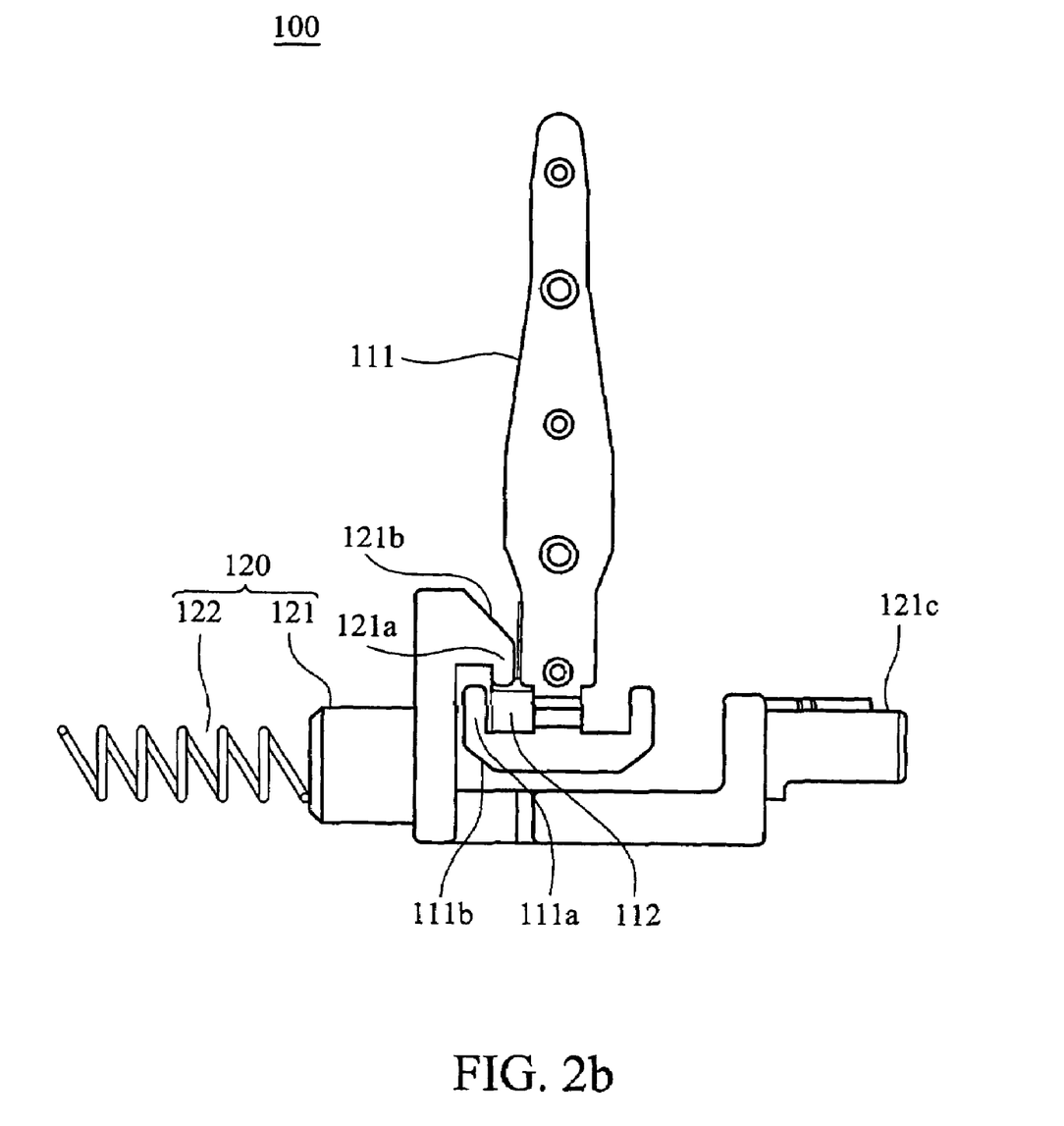
FIG. 2b is a schematic view of the assembled adjustable support in FIG. 1, wherein the moving assembly is in a third position, and the locking assembly is in a first position.

The adjustable support 100 includes an adjustable shaft 130 and a base 140. Thus, the support 100 can be used as a bottom member of the liquid crystal display 1 by means of the base 140, and it can be used to adjust the height of the display panel 2 by adjusting the length of the adjustable shaft 130 in a vertical orientation. Referring to FIG. 2, the adjustable support 100 further includes a moving assembly 110 and a locking assembly 120 in the adjustable shaft 130.

As shown in FIGS. 2a-3b, the locking assembly 120 is moveable between an idle position (shown in FIG. 2b and hereinafter referred as a first position) and an open position (shown in FIG. 3a and hereinafter referred as a second position). As shown in FIG. 2a, the moving assembly 110 includes an adjusting member 111 and a first elastic member 112, and the locking assembly 120 includes an engaging member 121 and a second elastic member 122. As shown in FIG. 1, an end portion 121c of the engaging member 121 is exposed by the adjustable shaft 130. By means of pressure applied to the end portion 121c, the engaging member 121 can be moved between the first position and the second position. As shown in FIG. 2b, when the engaging member 121 is in the first position, the engaging member 121 is abutted by the first elastic member 112 of the moving assembly 110. Furthermore, the engaging member 121 includes a first hook 121a, and the first hook 121a includes a first tapered surface 121b, facing the moving assembly 110, as shown in FIG. 2b.

The second elastic member 122 is connected to the other end portion of the engaging member 121, and returns the engaging member 121 to the first position. It is understood that the second elastic member 122 may be a compressed spring.

Figure 3A:
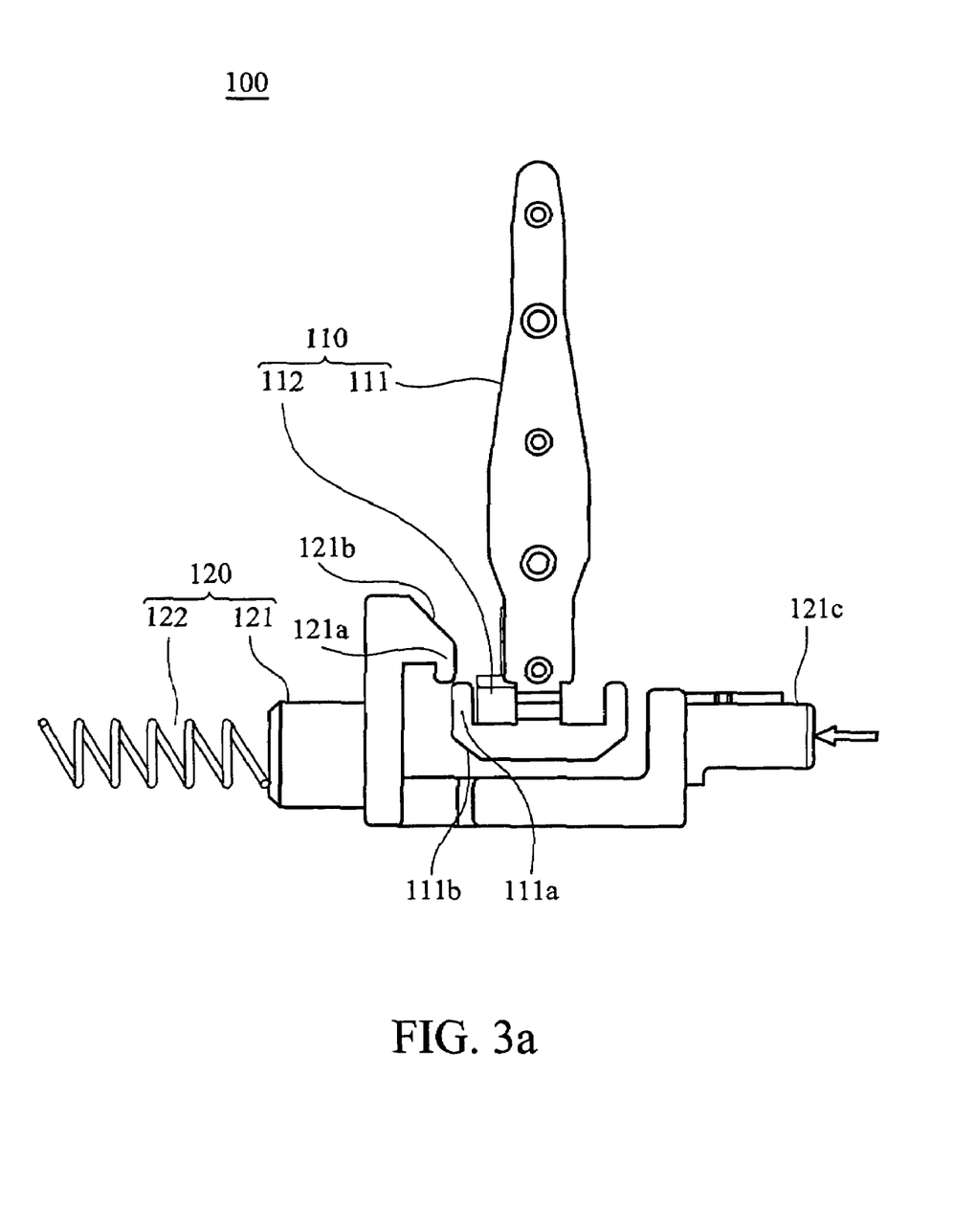
FIG. 3a is another schematic view of the adjustable support, wherein the moving assembly is in the third position, and the locking assembly is in a second position.
Figure 3B:
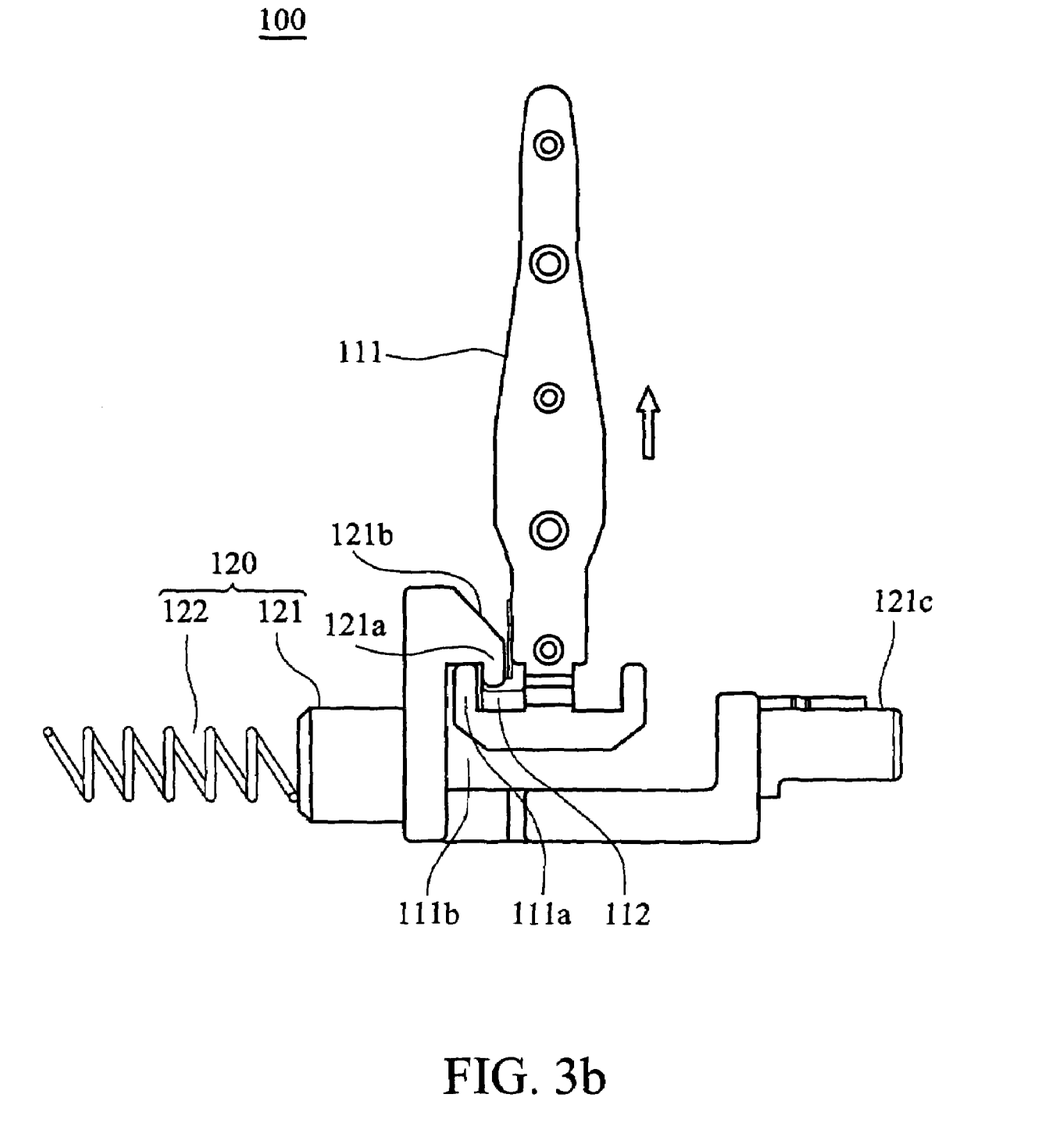
FIG. 3b is another schematic view of the adjustable support, wherein the moving assembly is in a fourth position, and the locking assembly is in the first position.

Referring to FIG. 1, the moving assembly 110 is indirectly connected to the display panel 2 via an intermediate portion 150. The moving assembly 110 can be moved in an upward/downward direction so that the length of the adjustable shaft 130 can be changed. Thus, the display panel 2 can be risen or lowered. As shown in FIG. 2b and FIG. 3b, the moving assembly 110 is moveable between an abutting position (shown in FIG. 2b and hereinafter referred as a third position) and a locking position (shown in FIG. 3b and hereinafter referred as a fourth position). That is, when the moving assembly 110 is in the third position and the locking assembly 120 is in the first position as shown in FIG. 2b, the moving assembly 110 is abutted by the locking assembly 120. When the moving assembly 110 is in the fourth position and the locking assembly 120 is in the first position, the moving assembly 110 engages the locking assembly 120 as shown in FIG. 3b.

Referring to FIG. 2a, the moving assembly 110 includes an adjusting member 111 and a first elastic member 112. The adjusting member 111 is indirectly connected to the display panel 2, and includes a second hook 111a. When the adjusting member 111 is in the fourth position and the engaging member 121 is in the first position, the second hook 111a engages the first hook 121a of the engaging member 121 as shown in FIG. 3b. Furthermore, the second hook 111a includes a second tapered surface 111b facing the locking assembly 120. When the adjusting member 111 moves downwardly and contacts the engaging member 121, the engaging member 121 is moved smoothly toward to the left side by the first tapered surface 121b and the second tapered surface 111b. The adjusting member 111 can move down until the second hook 111a engages the first hook 121a.

The first elastic member 112 is connected to the adjusting member 111, and maintains the adjusting member 111 at the third position as shown in FIG. 2b when there is no external force. It is understood that the second elastic member 112 may be a compressed spring.

The structure of the liquid crystal display is described as above, and its operation is described in the following.

Referring to FIG. 2b, when the display panel 2 of the liquid crystal display 1 is in the collapsed position, the moving assembly 110 is in the third position, and the locking assembly 120 is in the first position. At this time, the first elastic member 112 of the moving assembly 110 is abutted by the engaging member 121 of the locking assembly 120 so that the moving assembly 110 cannot freely rise to move the display panel 2. To rise the display panel 2, the engaging member 121 of the locking assembly 120 can be moved to the second position as shown in FIG. 3a. At this time, since the locking assembly 120 is not abutted by the moving assembly 110, the moving assembly 110 can rise, and the length of the adjustable shaft 130 is increased so that the display panel 2 is risen. In addition, to transport the liquid crystal display 1 in the collapsed state, the display panel 2 can be maintained in the collapsed state. Specifically, since the locking assembly 120 is in the first position, the moving assembly 110 can only move to the fourth position as shown in FIG. 3b even if the moving assembly 110 is subjected to external force by elevating the adjustable shaft 130. At this time, the first elastic member 112 is compressed, and the engaging member 121 of the locking assembly 120 engages the adjusting member 111 of the moving assembly 110. Thus, the entire liquid crystal display 1 is compact and easy to transport.

It is understood that the adjustable support 100 further includes guide rails and other components for guiding and positioning the movement of the moving assembly 110 in the adjustable shaft 130. Since these components are the same as the conventional ones, their description is omitted.

As stated above, the adjustable support of this embodiment is provided with the capability to remain in the collapsed state during transport. Thus, the support is compact, easing transport. Furthermore, when placed on a surface, the display panel can be freely risen or lowered by the moving assembly when pressure is applied on the engaging member of the locking assembly. In addition, since the moving assembly includes the elastic member, the support can reach the lowest position by the weight of the display panel itself and the force of the elastic member when the liquid crystal display is placed on a surface. Thus, the engaging member of the locking assembly is easily used.

Second Embodiment

Figure 4A:
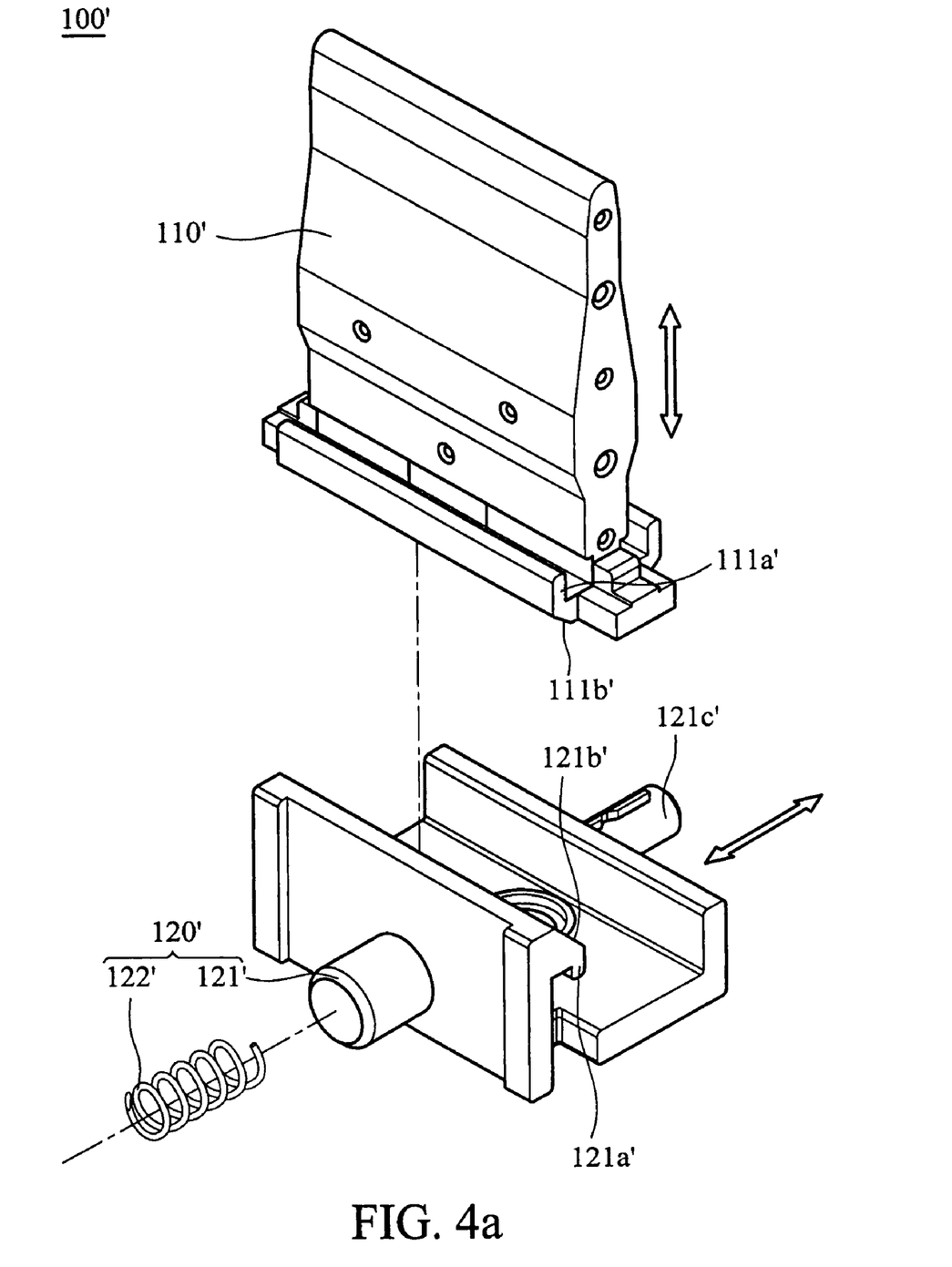
FIG. 4a is an exploded view of a variant embodiment of an adjustable support.
Figure 4B:
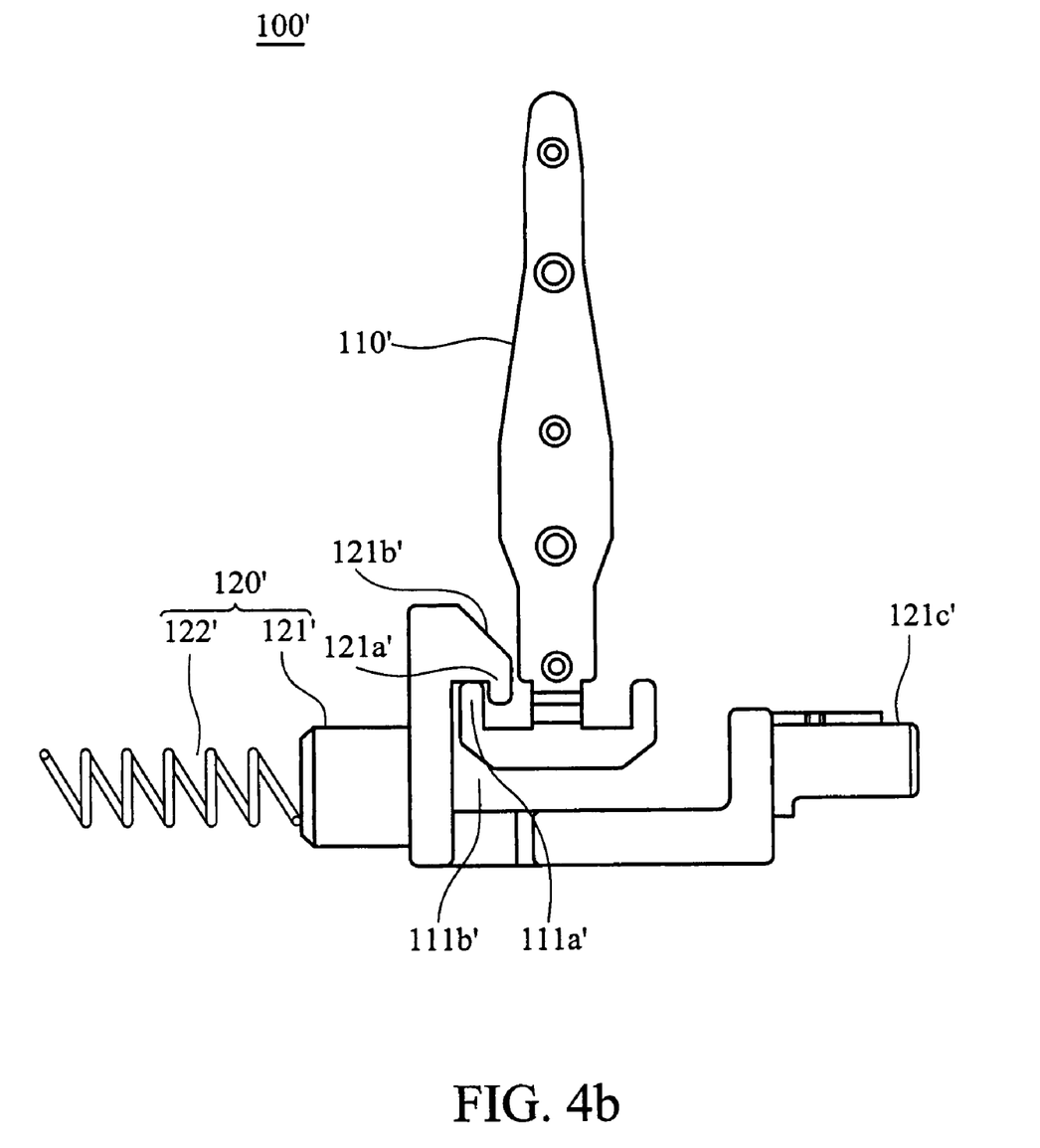
FIG. 4b is a schematic view of the assembled adjustable support in FIG. 4a, wherein the moving assembly is in a fourth position, and the locking assembly is in a first position.

FIG. 4a and FIG. 4b illustrate a second embodiment of an adjustable support. In this embodiment, the adjustable support 100' includes a moving assembly 110' and a locking assembly 120'. Since the locking assembly 120' is the same as the locking assembly 120 of the first embodiment, its description is omitted.

The moving assembly 110' of this embodiment differs the moving assembly 110 of the first embodiment in that the moving assembly 120' includes only one adjusting member 121' without the elastic member of the first embodiment. The moving assembly 110' is moveable between a separating position (shown in FIG. 5 and hereinafter referred as a third position) and an engaging position (shown in FIG. 4*b* and hereinafter referred as a fourth position). The locking assembly 120' includes an engaging member 121' and a third elastic member 122'.

Figure 5:
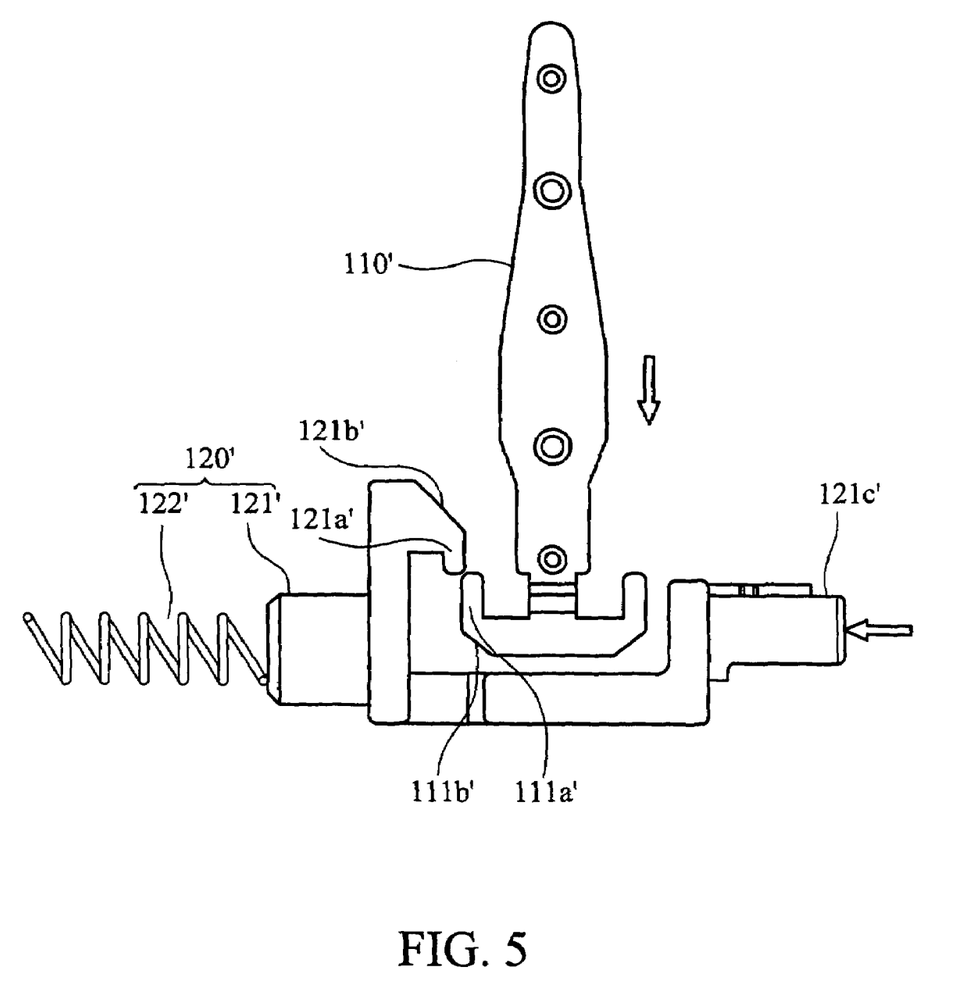
FIG. 5 is another schematic view of the adjustable support in FIG. 4b, wherein the moving assembly is in a third position, and the locking assembly is in a second position.

When the display panel of the liquid crystal display, including the support 100' of this embodiment, is in the collapsed state, the support 100' is as shown in FIG. 4*b*. When the moving assembly 110' is in the fourth position and the locking assembly 120' is in the first position, the moving assembly 110' engages the engaging member 121' of the locking assembly 120' so that the moving assembly 110' cannot freely elevate the display panel. To rise the display panel, the moving assembly 110' is moved down to the third position, and the locking assembly 120' is moved left to the second position as shown in FIG. 5. At this time, the locking assembly 120' is disengaged from the moving assembly 110' so that the moving assembly 110' can rise the display panel. The third elastic member 122' is connected to one end of the engaging member 121', and returns the engaging member 121' to the first position. It is understood that the third elastic member 122' may be a compressed spring.

As stated above, the adjustable support of this embodiment is provided with the capability to remain in the collapsed state during transport. Thus, the support is compact, easing transport. Furthermore, when placed on a surface, the display panel can be freely risen or lowered by the moving assembly when pressure is applied on the engaging member of the locking assembly.

It is noted that the structure of the support of this embodiment is simpler than that of the first embodiment since there is no elastic member in the moving assembly. However, in the absence of the elastic member, the moving assembly must be pressed down before pressing the engaging member of the locking assembly. Thus, the motion for rising the display panel is complicated.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display comprising:
   a display panel;
   a moving assembly connecting the display panel to move the display panel; and
   a locking assembly moving between a first position and a second position wherein the moving assembly abuts the locking assembly so that the display panel cannot be moved by the moving assembly when the locking assembly is in the first position and the moving assembly does not abut the locking assembly so that the display panel can be moved by the moving assembly when the locking assembly is in the second position;
   wherein the moving assembly is moved between a third position and a fourth position, the moving assembly engages the locking assembly when the moving assembly is in the fourth position and the locking assembly is in the first position, and the moving assembly is separated from the locking assembly when the moving assembly is in the third position and the locking assembly is in the first position.

2. The liquid crystal display as claimed in claim 1, wherein the locking assembly comprises:
   an engaging member moving between the first position and the second position, wherein the engaging member engages the moving assembly when the moving assembly is located in the fourth position and the engaging member is in the first position; and
   a third elastic member connecting the engaging member to return the engaging member to the first position.

3. The liquid crystal display as claimed in claim 2, wherein the engaging member includes a first hook, the moving assembly includes a second hook, and the first hook engages the second hook when the moving assembly is in the fourth position and the engaging member is in the first position.

4. The liquid crystal display as claimed in claim 3, wherein the first hook includes a first tapered surface facing the moving assembly, and the second hook includes a second tapered surface facing the locking assembly.

5. An adjustable support for rising and lowering a device comprising:
   a moving assembly connecting the device to rise and lower the device; and
   a locking assembly moving between a first position and a second position, wherein the moving assembly abuts the locking assembly so that the device cannot be moved by the moving assembly when the locking assembly is in the first position and the moving assembly does not abut the locking assembly so that the device can be moved by the moving assembly when the locking assembly is in the second position;
   wherein the moving assembly is moved between a third position and a fourth position, the moving assembly engages the locking assembly when the moving assembly is in the fourth position and the locking assembly is in the first position, and the moving assembly is separated from the locking assembly when the moving assembly is in the third position and the locking assembly is in the first position.

6. The adjustable support as claimed in claim 5, wherein the locking assembly comprises:
   an engaging member moving between the first position and the second position, wherein the engaging member engages the moving assembly when the moving assembly is located in the fourth position and the engaging member is in the first position; and
   a third elastic member connecting the engaging member to return the engaging member to the first position.

7. The adjustable support as claimed in claim 6, wherein the engaging member includes a first hook, the moving assembly includes a second hook, and the first hook engages the second hook when the moving assembly is in the fourth position and the engaging member is in the first position.

8. The adjustable support as claimed in claim 7, wherein the first hook includes a first tapered surface facing the moving assembly, and the second hook includes a second tapered surface facing the locking assembly.

* * * * *